United States Patent
More (10) Patent No.: US 12,475,873 B2
(45) Date of Patent: Nov. 18, 2025

(54) DUCTED ATTENUATOR SYSTEM FOR ENHANCING AIRFLOW AND REDUCING NOISE

(71) Applicant: Cummins Power Generation Inc., Minneapolis, MN (US)

(72) Inventor: Shashikant Ramdas More, Coon Rapids, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 316 days.

(21) Appl. No.: 18/115,570

(22) Filed: Feb. 28, 2023

(65) Prior Publication Data
US 2024/0290312 A1 Aug. 29, 2024

(51) Int. Cl.
*G10K 11/168* (2006.01)
*B32B 3/30* (2006.01)
(Continued)

(52) U.S. Cl.
CPC .............. *G10K 11/168* (2013.01); *B32B 3/30* (2013.01); *B32B 15/02* (2013.01); *B32B 15/18* (2013.01); *B32B 15/20* (2013.01); *B32B 25/04* (2013.01); *B32B 2250/40* (2013.01); *B32B 2262/0276* (2013.01); *B32B 2262/067* (2013.01); *B32B 2262/101* (2013.01); *B32B 2262/108* (2013.01); *B32B 2266/0278* (2013.01); *B32B 2266/0285* (2013.01); *B32B 2307/102* (2013.01); *B32B 2607/00* (2013.01)

(58) Field of Classification Search
CPC ......... G10K 11/168; B32B 3/30; B32B 15/02; B32B 15/18; B32B 15/20; B32B 25/04; B32B 2250/40; B32B 2262/0276; B32B 2262/067; B32B 2262/101; B32B 2262/108; B32B 2266/0278; B32B 2266/0285; B32B 2307/102; B32B 2607/00
See application file for complete search history.

(56) References Cited

U.S. PATENT DOCUMENTS

| | | | |
|---|---|---|---|
| 3,913,702 A | 10/1975 | Wirt et al. | |
| 4,007,388 A * | 2/1977 | Lawyer | H02K 5/24 181/202 |

(Continued)

FOREIGN PATENT DOCUMENTS

| | | |
|---|---|---|
| EP | 3 783 210 A1 | 2/2021 |
| WO | WO-2014/195729 A2 | 12/2014 |
| WO | WO-2016/129808 A1 | 8/2016 |

*Primary Examiner* — Forrest M Phillips
(74) *Attorney, Agent, or Firm* — Foley & Lardner LLP (57) ABSTRACT

A genset includes an enclosure and an attenuator assembly coupled to the enclosure. The enclosure defines an at least partially enclosed space and a ventilation air opening. The ventilation air opening fluidly couples the enclosed space with an environment surrounding the enclosure. The attenuator assembly includes a plurality of ducted attenuator panels arranged parallel to one another and parallel to an air flow direction through the enclosure. The plurality of ducted attenuator panels is spaced apart from one another to form a plurality of air passages therebetween. At least one ducted attenuator panel of the plurality of ducted attenuator panels defines a plurality of ducts extending parallel to the air flow direction.

20 Claims, 10 Drawing Sheets

(51) Int. Cl.
    *B32B 15/02*     (2006.01)
    *B32B 15/18*     (2006.01)
    *B32B 15/20*     (2006.01)
    *B32B 25/04*     (2006.01)

(56) References Cited

U.S. PATENT DOCUMENTS

| | | |
|---|---|---|
| 4,236,597 A | 12/1980 | Kiss et al. |
| 5,268,541 A | 12/1993 | Pettersson |
| 5,728,980 A | 3/1998 | Zarnick |
| 6,450,133 B1 * | 9/2002 | Bernard .................. F01P 5/04 |
| | | 454/118 |
| 8,240,427 B2 * | 8/2012 | Jangili .............. F16L 55/02709 |
| | | 181/224 |
| 8,272,475 B2 | 9/2012 | Helenius et al. |
| 8,997,923 B2 | 4/2015 | Ichihashi |
| 9,640,164 B2 | 5/2017 | Gerken et al. |
| 10,411,556 B1 * | 9/2019 | Sakaray ................. F02B 77/11 |
| 10,458,589 B2 * | 10/2019 | Hill ........................ F24F 13/24 |
| 11,557,937 B2 * | 1/2023 | More ...................... F02B 77/13 |
| 11,562,727 B2 * | 1/2023 | Sandiford ............ G10K 11/172 |
| 11,885,264 B2 * | 1/2024 | Lin ........................ B33Y 10/00 |
| 2014/0014436 A1 | 1/2014 | Nguyen et al. |
| 2016/0071507 A1 | 3/2016 | Kim |
| 2020/0049373 A1 | 2/2020 | Huang |
| 2021/0175774 A1 * | 6/2021 | More ....................... F01P 7/10 |
| 2022/0098886 A1 * | 3/2022 | More ........................ E04H 5/02 |
| 2022/0205385 A1 * | 6/2022 | Wang ................. F02M 35/1211 |

\* cited by examiner

FIG. 13 ical Field

The present disclosure relates generally to attenuator systems for noise attenuation. In particular, the present disclosure relates to attenuator systems to reduce exported noise from enclosures for housing engines and generators.

BACKGROUND

Generator sets (also known as "gensets") may be employed for physical power production in a variety of applications (e.g., standby/backup power applications, etc.). A genset typically includes an engine and an electric power generator coupled to the engine. The engine is structured to mechanically drive the generator which, in turn, can produce electricity. The engine and the generator may be housed within an enclosure that allows the genset to operate outdoors, and to tolerate environmental extremes of temperature, humidity, precipitation (e.g., rain, snow, ice, etc.), and other factors.

SUMMARY

One embodiment of the present disclosure relates to a genset. The genset includes an enclosure and an attenuator assembly coupled to the enclosure. The enclosure defines an at least partially enclosed space and a ventilation air opening. The ventilation air opening fluidly couples the enclosed space with an environment surrounding the enclosure. The attenuator assembly includes a plurality of ducted attenuator panels arranged parallel to one another and parallel to an air flow direction through the enclosure. The plurality of ducted attenuator panels is spaced apart from one another to form a plurality of air passages therebetween. At least one ducted attenuator panel of the plurality of ducted attenuator panels defines a plurality of ducts extending parallel to the air flow direction.

Another embodiment of the present disclosure relates to an attenuator assembly that may be used in a genset enclosure. The attenuator assembly includes a plurality of ducted attenuator panels and a support structure. At least one panel of the plurality of ducted attenuator panels defines a plurality of ducts extending therethrough. The support structure supports the plurality of ducted attenuator panels in a parallel spaced arrangements so as to define a plurality of air passages between adjacent ones of the plurality of ducted attenuator panels. The plurality of air passages extends parallel to the plurality of ducts.

Yet another embodiment of the present disclosure relates to a method of manufacturing a ducted attenuator assembly. The method includes coupling a first ducted attenuator panel to a support structure. The method also includes placing a second ducted attenuator panel onto the support structure a distance apart from the first ducted attenuator panel and so that (i) the second ducted attenuator panel extends parallel to the first ducted attenuator panel, and (ii) a first plurality of ducts of the first ducted attenuator panel extend parallel to a second plurality of ducts of the second ducted attenuator panel and an air passage formed between the first ducted attenuator panel and the second ducted attenuator panel. The method further includes coupling the second ducted attenuator panel to the support structure to maintain a spacing between the first ducted attenuator panel and the second ducted attenuator panel.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE FIGURES

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for suppressing acoustic noise generated as a result of ventilation air entering and exiting a genset enclosure. The ventilation air can enter or exit through openings in the enclosure housing which also provide a path through which sound from the engine and other components can exit the enclosure.

In particular, embodiments described herein relate generally to a ducted attenuator assembly that is configured to be positioned within an enclosure adjacent to an air opening of the enclosure, and that is configured to reduce exported noise through the air opening. In at least one embodiment, the ducted attenuator assembly includes a plurality of ducted attenuator panels that each define a plurality of ducts extending therethrough. The panels are spaced apart from one another and oriented parallel to an air flow direction through the genset enclosure (e.g., parallel to a longitudinal direction through the enclosure between the inlet and the outlet of the genset enclosure, etc.), so that air passages between adjacent ones of the panels extend parallel to the plurality of ducts in the attenuator panels. In such an arrangement, air can flow through the ducts as well as the air passages in between adjacent panels, thereby increasing the overall surface area of the panel material that is exposed to air flow and noise attenuation performance per unit length of the baffle in the air flow direction. By improving noise attenuation performance, an overall length of the attenuator panel assembly can be reduced, which can reduce the size and mass of the genset enclosure without increasing air flow restriction through the genset enclosure.

In some embodiments, the ducted attenuator assembly includes a support structure coupled to the plurality of ducted attenuator panels. The support structure can be configured to maintain spacing between adjacent panels. The support structure can include a skid having a framework to support the plurality of ducted attenuator panels. The skid can be configured to couple the ducted attenuator assembly to a genset enclosure. In some embodiments, the skid can be configured to form part of the genset enclosure. For example, the skid may define a module and/or section of a genset enclosure that can be transported separately from other parts of the genset enclosure and can be assembled on site. In some embodiments, the skid includes a platform extending beneath the plurality of ducted attenuator panels and that, when coupled to the genset enclosure, defines a portion of an outer wall of the genset enclosure.

The various concepts introduced above and discussed in greater detail below may be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Figure 1:
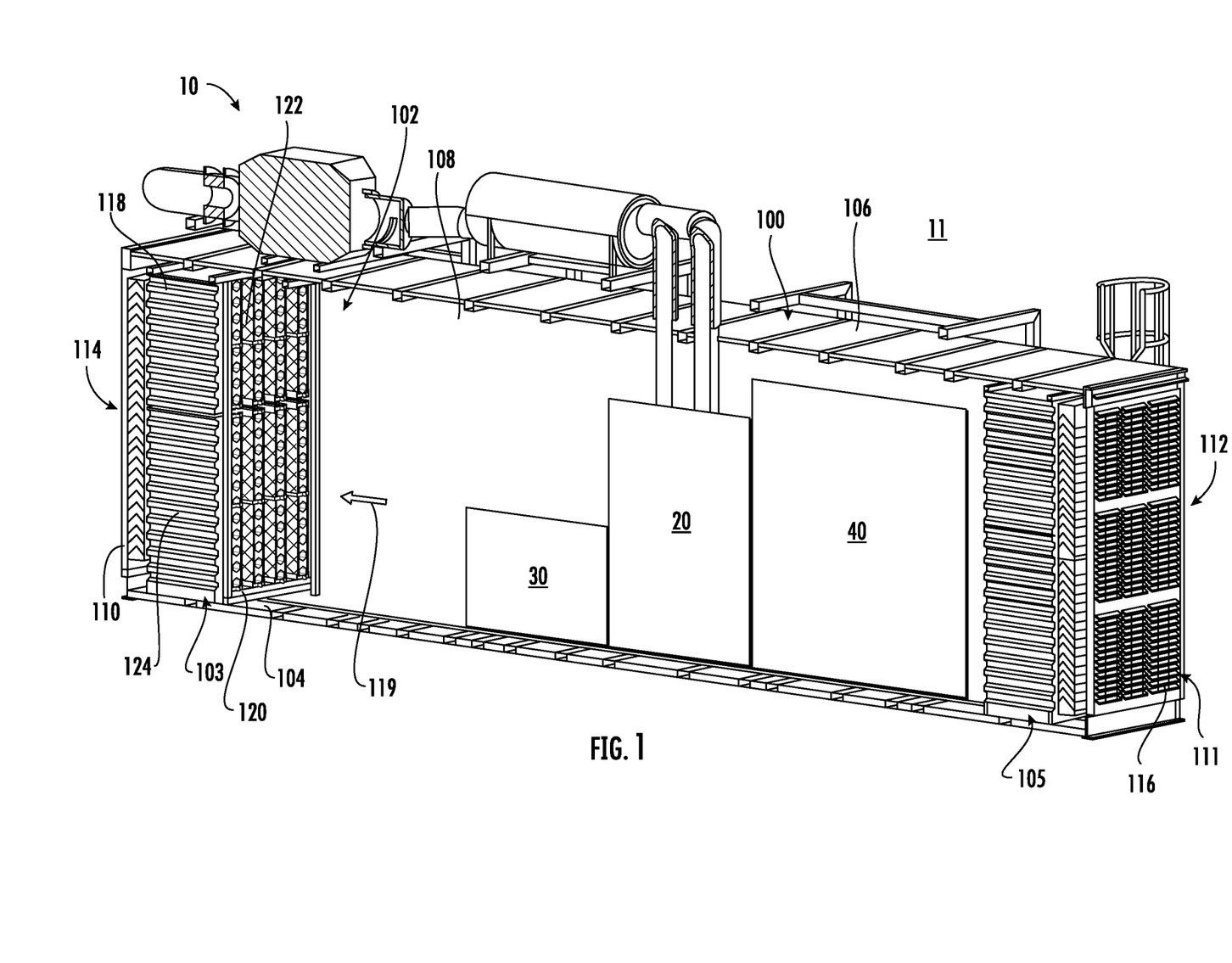
FIG. 1 is a perspective cross-sectional view of a genset, according to an embodiment.

FIG. 1 is a side-cross-sectional view of a genset 10 (e.g., generator set, etc.), according to an embodiment. The genset 10 is configured to generate and provide power to equipment for a variety of different applications. The genset 10 includes an enclosure 100 and an attenuator assembly 103. In one example, the genset 10 includes an engine 20, a generator 30, an air driver 40, the enclosure 100, and at least one ducted attenuator assembly 103. The engine 20 can be a diesel engine, a gasoline engine, a natural gas engine, a dual fuel engine, a biodiesel engine, an E85 engine, a flex fuel engine, a gas turbine, or another type of engine or driver. In various embodiments, the engine 20 can be a high horsepower (HHP) engine capable of providing power in the range of 500 hp to 4,500 hp or more. The generator 30 can be an electric power generator, an alternator, or the like. In one embodiment, the engine 20 is coupled to the generator 30 by, for example, a driveshaft (not shown). In operation, the engine 20 drives the generator 30 to produce electricity (e.g., power). Embodiments of the present disclosure are also applicable for various types of prime movers (mechanical, electrical, hydro, and/or fuel cell types) with various power strengths (low, medium, and high horsepower).

The air driver 40 is structured to draw air (e.g., ventilation air, cooling air, etc.) from an environment surrounding the enclosure 100 through the enclosure 100 to cool the genset 10. In one embodiment, the air driver 40 is a fan. In other embodiments, the air driver 40 includes a plurality of fans positioned at different locations within the enclosure 100. In some embodiment, the fan can be coupled to the engine 20 (e.g., to the engine driveshaft via a pulley, etc.) such that a speed of the fan is proportional to a speed of the engine 20. In other embodiments, the fan is driven separately from the engine 20 (e.g., via an electric fan motor, etc.).

As shown in FIG. 1, the enclosure 100 includes end walls (e.g., container walls, side walls, etc.) defining an at least partially enclosed space 102 (e.g., an internal volume, a hollow cavity, a hollow region, etc.) for housing the engine 20, the generator 30, the air driver 40, and other genset components. The end walls include a container floor 104, a container roof 106, and a pair of container side walls 108. The container side walls 108 are arranged in substantially perpendicular orientation relative to the container floor 104 and container roof 106 (e.g., the container side walls 108 can extend perpendicular to the container floor 104). The container floor 104 and the container roof 106 are coupled at their lateral edges to edges of the container side walls 108. One or more doors can be provided in one or both of the container side walls 108 to allow an operator of the genset 10 (e.g., maintenance or repair personnel) to enter the enclosed space 102 defined by the enclosure 100 and access the genset 10.

A pair of container end walls 110 are positioned at longitudinal ends of the enclosure 100 and coupled to corresponding edges of the container floor 104, the container roof 106, and the pair of container side walls 108. The pair of container end walls 110 are positioned so as to seal the enclosure 100 from the surrounding environment. The container floor 104, container roof 106, container side walls 108, and container end walls 110 can be formed from any suitable material, for example, corrugated weathering steel. Furthermore, the enclosure 100 can have the dimensions of a standard ISO container (e.g., a length of about 6.1 meters, 12.2 meters, 14.6 meters or about 16.2 meters and a height of about 2.59 meters, 2.9 meters, or about 3.2 meters). In other embodiments, the enclosure 100 can include a non-ISO container, for example, any non-standard sized ISO container. The enclosure 100 can be formed from flat sheet metal, die-stamped sheet metal or a non-metallic material (e.g., wood, plastics, reinforced polymers, cement, concrete, fiber glass, carbon fiber, etc.) or any combination of the foregoing.

The enclosure 100 is configured to provide air flow therethrough to cool the genset 10 and provide intake air for the engine of the genset 10. As shown in FIG. 1, the enclosure 100 includes a ventilation air opening 111 that fluidly couples the enclosed space 102 with an environment 11 surrounding the enclosure 100. The enclosure 100 can include a plurality of ventilation air openings including a ventilation air intake opening, shown as air inlet 112 (e.g., an inlet, etc.), and a ventilation air outlet opening, shown as air outlet 114 (e.g., an outlet, etc.). In some embodiments, the air inlet 112 and the air outlet 114 are disposed at opposing longitudinal ends of the enclosure 100 (e.g., the air inlet 112 and the air outlet 114 are defined by the container end walls 110 of the enclosure 100). In other embodiments, at least one of the air inlet 112 and the air outlet 114 are defined in the container roof 106. In some embodiments, the air inlet 112 and/or the air outlet 114 can include louvers 116 or other elements that allow air exchange with the enclosed space 102 within the enclosure 100, while redirecting water (e.g., due to rainfall) away from the enclosure 100 or to predefined water drainage areas of the enclosure 100. In other embodiments, the air inlet 112 and the air outlet 114 can be provided in another location along the enclosure 100 (e.g., the pair of container side walls 108, the container roof 106, or a combination thereof).

As shown in FIG. 1, the genset 10 includes a pair of ducted attenuator assemblies disposed within the enclosed space 102. The pair of ducted attenuator assemblies includes a first ducted attenuator assembly 103 disposed proximate to (e.g., adjacent to) a first longitudinal end of the enclosure 100, and a second ducted attenuator assembly 105 disposed proximate to a second longitudinal end of the enclosure 100 that is opposite from the first longitudinal end. The ducted attenuator assemblies are configured to absorb and attenuate noise produced by the genset 10 and to reduce exported noise from the enclosed space 102 to an environment surrounding the enclosure 100. The noise can be generated by internal components of the genset 10 such as the engine 20, the generator 30, the fan(s), and the like. Additionally, the noise can be produced as a result of air flow passing through the enclosure 100 via the air inlet 112 and the air outlet 114.

The ducted attenuator assembly (e.g., the attenuator assembly, etc.) is configured to act as an acoustic silencer for the genset and to reduce noise levels within air entering and/or leaving the enclosure. As shown in FIG. 1, the ducted attenuator assembly (shown as first ducted attenuator assembly 103 and second ducted attenuator assembly 105) can be disposed proximate to a ventilation air opening, such as the air inlet 112 or the air outlet 114 so as to reduce noise levels exported by air leaving or entering through the ventilation air opening.

The first ducted attenuator assembly 103 can be substantially similar or identical to the second ducted attenuator assembly 105. In other embodiments, the first ducted attenuator assembly 103 can be arranged differently from the second ducted attenuator assembly 105 (e.g., the first ducted attenuator assembly 103 can have more or fewer panels, and/or can have a length that is different from the second ducted attenuator assembly 105 depending on the required noise attenuation performance at the air inlet 112 and the air outlet 114, etc.). For simplicity, the design and structure of the ducted attenuator assembly will be described with respect to the first ducted attenuator assembly 103 only.

As shown in FIG. 1, the first ducted attenuator assembly 103 includes a plurality of ducted attenuator panels 118 and a support structure 120 coupled thereto. The plurality of ducted attenuator panels 118 are configured to redirect noise in the air passing therethrough multiple times to reduce noise levels in the air. The plurality of ducted attenuator panels 118 are arranged parallel to one another and parallel to an air flow direction 119 through the enclosure 100 (e.g., parallel to a longitudinal direction extending between the air inlet 112 and the air outlet 114, etc.). The plurality of ducted attenuator panels 118 are also arranged parallel to the container side walls 108 of the enclosure 100 so as to form a space for air to flow between (i) an outermost ducted attenuator panel at a lateral end of the first ducted attenuator assembly 103 and (ii) the container side wall 108.

The plurality of ducted attenuator panels 118 are spaced apart from one another along a lateral direction within the enclosure 100 to form a plurality of air passages 122 therebetween. In such an arrangement, air entering and/or leaving the enclosure 100 can pass along a full length of at least two of the ducted attenuator panels 118 (e.g., along the sides of the ducted attenuator panels 118). In this manner, the noise can be redirected multiple times within the air passage 122 between the at least two ducted attenuator panels 118. At least one panel of the plurality of ducted attenuator panels 118 defines a plurality of ducts 124 extending parallel to the air flow direction 119 through the enclosure 100. The plurality of ducts 124 can be enclosed channels or cavities that extend through an entire length of the at least one panel in the air flow direction 119. The air flow direction can be a longitudinal direction through the enclosure 100, between a first panel end of the at least one panel and a second panel end of the at least one panel that is opposite the first panel end. As will be further described, the plurality of ducts 124 can be spaced at approximately equal intervals along a column along a linear column that extends across an inlet face of the at least one panel.

The support structure 120 is configured to support the plurality of ducted attenuator panels 118 and to couple the ducted attenuator panels 118 to the enclosure 100. As shown in FIG. 1, the support structure 120 is coupled to the plurality of ducted attenuator panels 118 so as to maintain approximately equal spacing between adjacent ones of the plurality of ducted attenuator panels 118.

Figure 2:
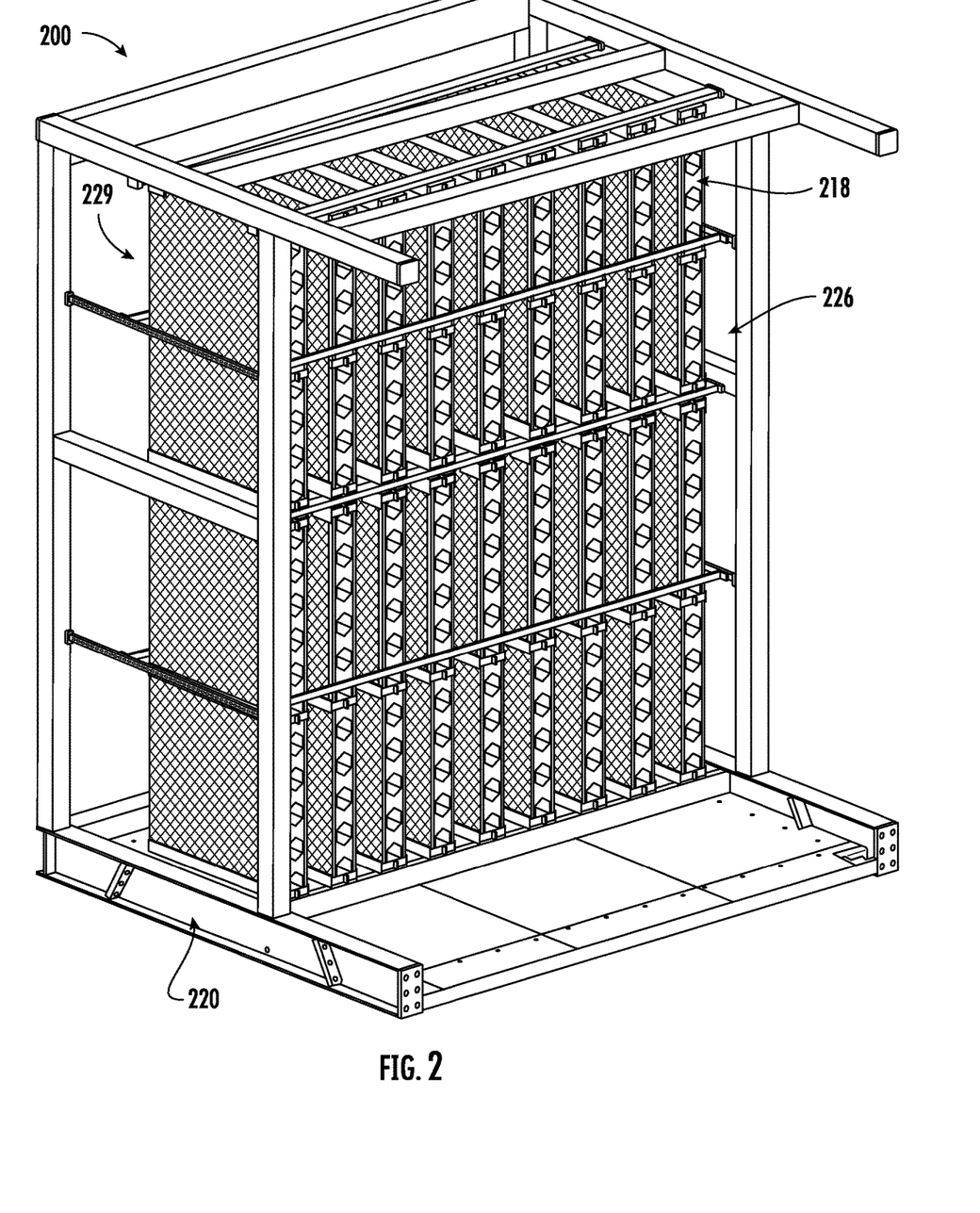
FIG. 2 is a perspective view of a ducted attenuator assembly that can be used in the genset of FIG. 1, according to an embodiment.

FIG. 2 shows a ducted attenuator assembly 200 that can be used with the genset 10 of FIG. 1, according to an embodiment (that can be the same as or similar to the first ducted attenuator assembly 103 and/or the second ducted attenuator assembly 105 of FIG. 1). Similar to the first ducted attenuator assembly 103 of FIG. 1, the ducted attenuator assembly 200 of FIG. 2 includes a plurality of ducted attenuator panels 218 and a support structure 220 coupled to and supporting the plurality of ducted attenuator panels 218.

Figure 3A:
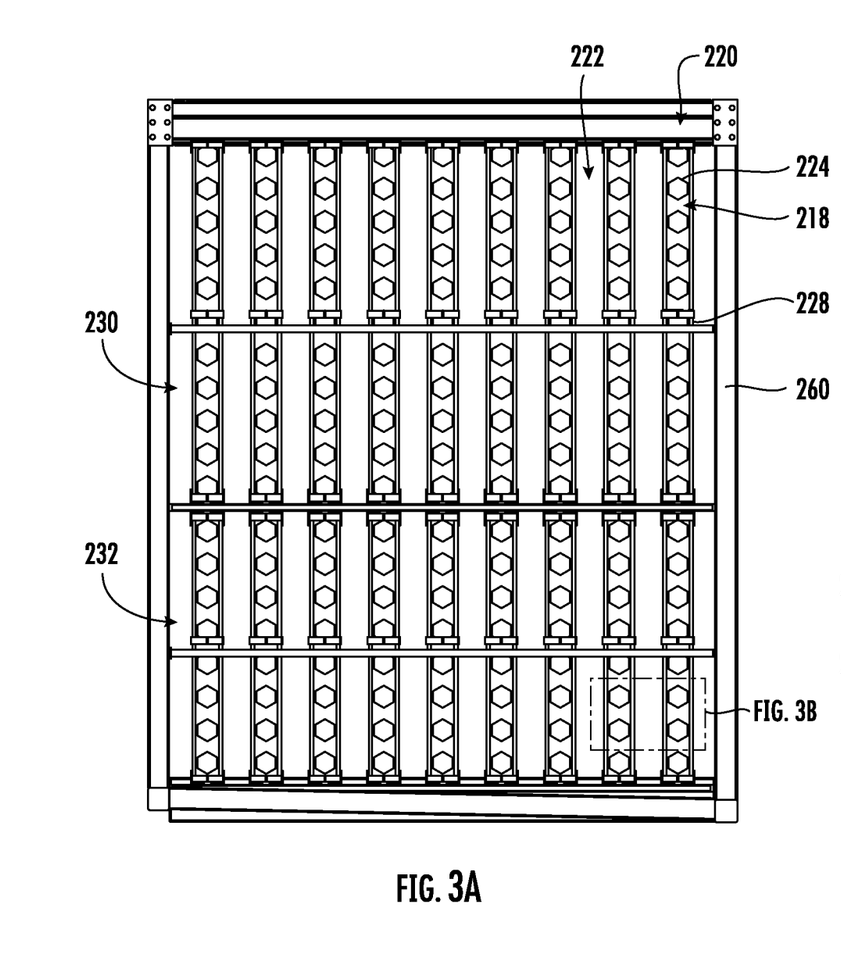
FIG. 3A is a front view of the ducted attenuator assembly of FIG. 2.

As shown in FIG. 3A, the support structure 220 includes a plurality of mounts 228 that are each configured to engage with a respective one of the plurality of ducted attenuator panels 218. The mounts 228 can be brackets that couple to the panels at upper and/or lower ends of the panels. In other embodiments, the mounts can be openings disposed in the framework 260 of the support structure 220 to received fasteners for coupling the ducted attenuator panels to the support structure 220. In yet other embodiments, the ducted attenuator panels 218 can be welded or otherwise secured to the support structure 220. The plurality of ducted attenuator panels 218 can be arranged in vertically aligned rows, shown as a first panel row 230 and a second panel row 232 beneath the first panel row 230, so that individual panels from the first panel row 230 and the second panel row 232 are substantially vertically aligned. It should be appreciated that the side and geometry of the individual ducted attenuator panels 218 may differ in various embodiments, along with the size, number, and arrangement of rows and/or columns of the ducted attenuator assembly 200, depending on the size of the genset enclosure, the components used in the genset, and the desired levels of noise attenuation.

Figure 3B:
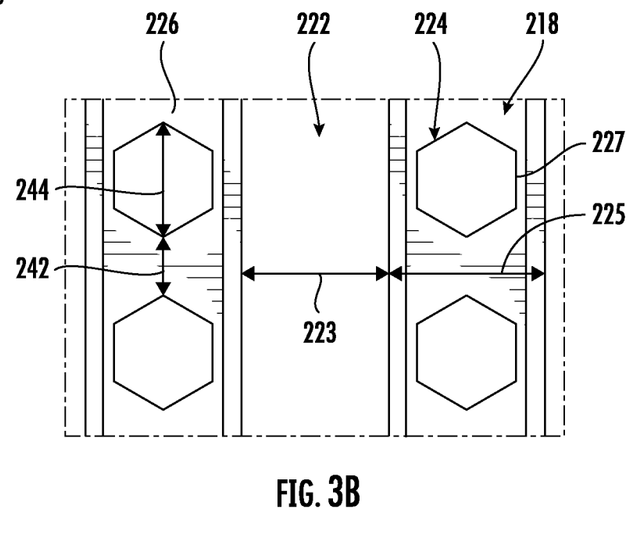
FIG. 3B is a front view of a portion the ducted attenuator assembly of FIG. 3A, showing a gap between adjacent panels of the ducted attenuator assembly.

As shown in FIGS. 3A-3B, the support structure 220 is configured to support the plurality of ducted attenuator panels 218 in a parallel spaced arrangement. In this manner, the support structure 220 defines a plurality of air passages 222 between adjacent ones of the plurality of ducted attenuator panels 218 (between pairs of ducted attenuator panels, etc.). As used herein, "parallel spaced arrangement" refers to an arrangement of the ducted attenuator panels 218 that provides at least one of (i) approximately uniform spacing between adjacent panels along their length in an air flow direction (e.g., in a longitudinal direction through the ducted attenuator assembly 200, etc.), and/or (ii) approximately uniform spacing between surfaces of the ducted attenuator panels 218 that define the air passages 222.

In some embodiments, the support structure 220 is configured to maintain approximately uniform spacing between all of the ducted attenuator panels 218 of the ducted attenuator assembly 200, so as to maintain approximately uniform noise attenuation characteristics across the ducted attenuator assembly 200. For example, a panel spacing 223 between adjacent ducted attenuator panels 218 (e.g., a width of the air passages 222 or gaps between panels) can be approximately equal to a width 225 of each of the ducted attenuator panels 218. In some embodiments, the spacing between a first pair of adjacent ducted attenuator panels 218 can vary to be +2%, 5% or 10% than the spacing between a second pair of adjacent ducted attenuator panels 218. In other embodiments, the spacing between the ducted attenuator panels 218 can be different. In some embodiments, the spacing between the ducted attenuator panels 218 can vary with lateral position along the support structure 220 which, in some instances, can improve flow uniformity across the ducted attenuator assembly 200. It should be appreciated that the size, spacing, and number of panels can vary depending on application requirements.

As shown in FIGS. 3A-3B, at least one ducted attenuator panel 218 defines a plurality of ducts 224 extending therethrough, between a first panel end 226 of the at least one panel and the second panel end 229 (shown in FIG. 2) opposite the first panel end 226 (e.g., extending between opposing longitudinal ends of the at least one panel). The plurality of ducts 224 extend parallel to the air passages 222 between the plurality of ducted attenuator panels 218.

The use of ducts 224 in combination with the parallel air passages 222 increases the flow area through the ducted attenuator assembly 200, while at the same time increasing the surface area of acoustic damping material within each ducted attenuator panel 218 that is exposed to the air flow. In some embodiments, the use of ducts 224 and parallel air passages 222 in combination can increase the flow area by approximately 25%, 30%, or greater, while also increasing the surface area available for noise absorption by a factor of approximately 2-3 times, or greater, in comparison to using the air passages alone, depending on the geometry, size, and number of ducts 224. Such an arrangement can also increase noise attenuation performance per unit length of attenuator assembly 200 (in the air flow direction). This in turn results in a reducing in size and mass of the ducted attenuator assembly 200. For example, the length of the ducted attenuator assembly 200 can scale with the increase in surface area of the ducted attenuator panels 218. Combined with the reduction in weight associated with the ducts 224, the reduction in attenuator length can result in an increase in the overall weight of the attenuator assembly 200 by a factor of 11 to 12 times, or greater, when compared with an attenuator design using air passages 222 only.

The plurality of ducts 224 can be defined by at least one layer of acoustic damping material defining walls of the plurality of ducts 224 and that enclose the duct from the environment in the space between opposing panel ends. As shown in FIG. 3B, a spacing 242 between adjacent ones of the plurality of ducts 224 can be greater than or equal to half of a height 244 of at least one duct 224 of the plurality of ducts 224. In other embodiments, the spacing between adjacent ducts 224 can be different. The area between adjacent ducts can be filled with acoustic damping material (e.g., the ducts 224 can be defined from one or more layers of acoustic damping material 236), as will be further described.

In at least one embodiment, as shown in FIG. 3B, at least one duct of the plurality of ducts 224 has a hexagonal cross-sectional shape. In some instances, at least one duct 224 forms a hexagonally-shaped opening 227 on at least one end of the ducted attenuator panel 218 (e.g., the first panel end 226). In other embodiments, the shape of the ducts 224 can be different. For example, the ducts 224 can have a cross-section forming a circle, an oval, a rectangle, a square, a diamond, or another polygonal shape.

Figure 4A:
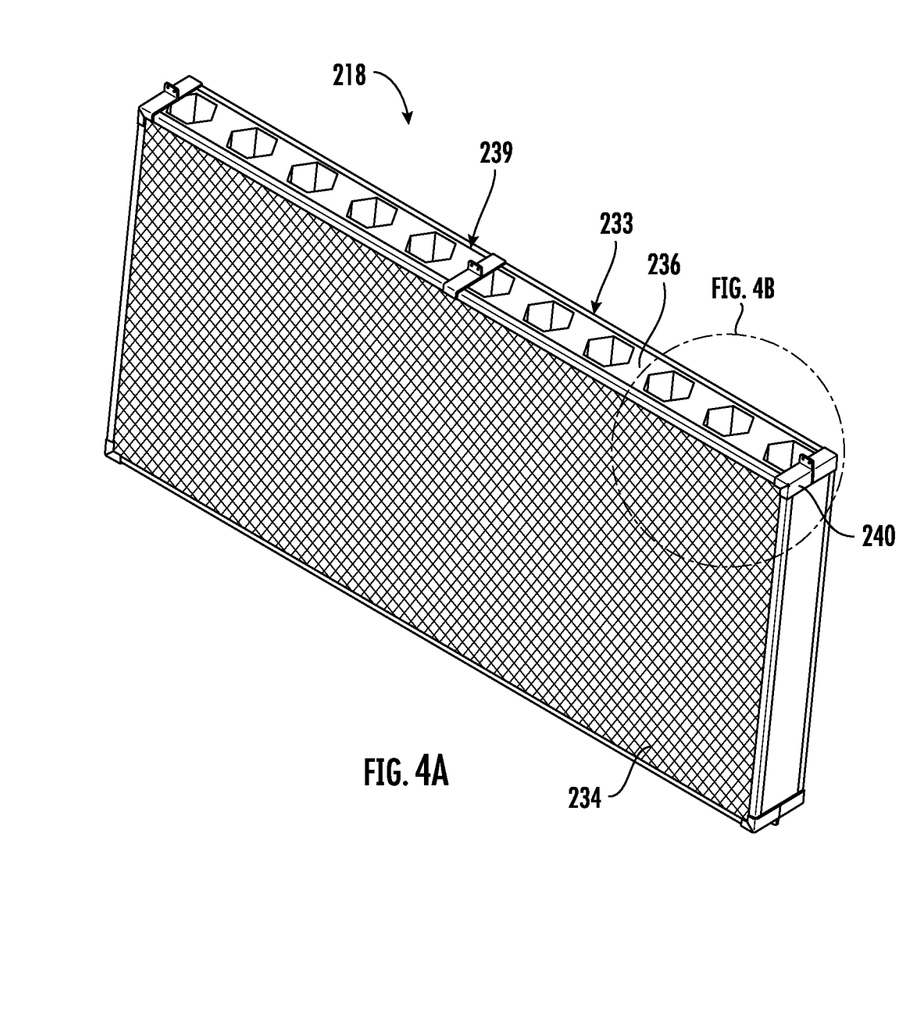
FIG. 4A is a perspective view of a ducted attenuator panel of the ducted attenuator assembly of FIG. 2.
Figure 4B:
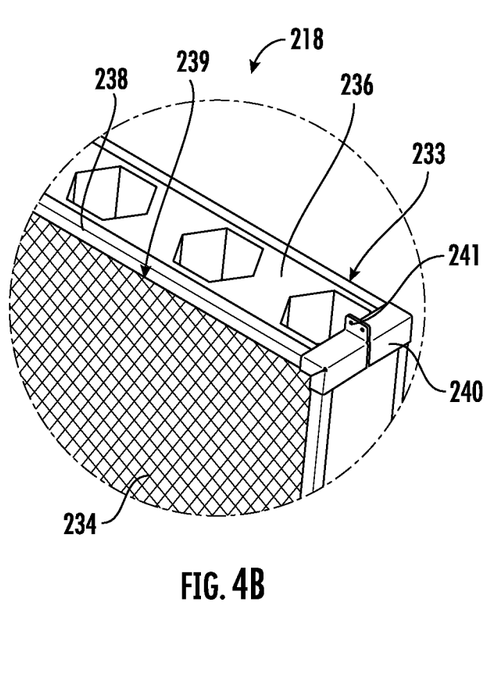
FIG. 4B is a perspective view of a corner region of the ducted attenuator panel of FIG. 4A.

FIGS. 4A-4B show a ducted attenuator panel 218 of the ducted attenuator assembly 200 of FIG. 2. The ducted attenuator panel 218 can be configured to couple to the support structure 220 (e.g., to the mounts 228 as shown in FIG. 3A, etc.). The ducted attenuator panels 218 can be at least partially made from an acoustic damping material that includes a fibrous or non-fibrous material to absorb noise from air passing through the ducts 224 and alongside the ducted attenuator panels 218.

The ducted attenuator panel 218 can include a support frame 233, a mesh 234, and at least one layer of acoustic damping material 236. In other embodiments, the ducted attenuator panel 218 can include additional, fewer, and/or different components. The support frame 233 can be configured to provide structural support to the at least one layer of acoustic damping material 236. In some embodiments, the support frame 233 can be configured to hold the mesh 234 against the acoustic damping material 236. For example, the support frame 233 (e.g., frame elements, trim pieces, and/or frame supports of the support frame 233) can extend along edges 238 of the layer of acoustic damping material 236.

As shown in FIGS. 4A-4B, the support frame 233 can define openings 239 (e.g., windows, etc.) to allow air to access surfaces of the acoustic damping material 236. In some embodiments, the support frame 233 can also include bracket elements 240 that are welded or otherwise fastened to trim pieces of the support frame 233 to hold the trim pieces together. The bracket elements 240 can also include fastener openings 241, clips, and/or other types of connectors to facilitate coupling adjacent sections of the support frame 233 on either side of the acoustic damping material 236 and/or to facilitate coupling of the ducted acoustic panel 218 to the support structure 220 (see FIG. 3A). The support frame 233 can be made from steel, aluminum, plastic, or another type of rigid and lightweight material.

The mesh 234 is configured to support the acoustic damping material 236 and the exposed surfaces of the acoustic damping material 236 (e.g., along the surfaces of the air passages, etc.). As shown in FIGS. 4A-4B, the mesh 234 is coupled to the support frame 233 and supports the layer of acoustic damping material 236 within the support frame 233, which can prevent deformation or sagging of the acoustic damping material 236 and thereby maintain uniform spacing between adjacent ones of the ducted attenuator panels 218 in the ducted attenuator assembly 200 (see FIG. 3A). An outer perimeter of the mesh 234 can be "sandwiched" or otherwise disposed between the support frame 233 and the layer of acoustic damping material 236.

In at least one embodiment, the mesh 234 is an expanded metal grill or wire mesh made from steel, aluminum, plastic, or another strong and lightweight material. Among other benefits, the combination of the mesh 234 and the support frame 233 can provide increased exposed surface area of the acoustic damping material 236 while preventing sag or deformation of the acoustic damping material. The mesh 234 can also facilitate noise absorption by reflecting sound to different parts of the panels (e.g., due to bends in links and/or wire elements forming the mesh).

The layer of acoustic damping material 236 can be formed as a sheet of material that is "sandwiched" or otherwise disposed between layers of the mesh 234 on either side of the ducted attenuator panel 218 (e.g., a first mesh layer disposed on a first side of the acoustic damping material, and a second mesh layer disposed on a second side of the acoustic damping material opposite the first side). In various embodiments, the acoustic damping material can include fibrous (e.g., rock wool, glass wool, mineral wool, etc.), non-fibrous (e.g., polyurethane foam, melamine foam, etc.) materials, or the like. In some embodiments, the acoustic damping material includes polyester fibrous material, rubber, wood fiber, textile fiber, or other type of acoustic damping material. In some embodiments, the acoustic damping material includes multiple layers made of different acoustic absorption materials that are laminated or otherwise coupled together.

Figure 5:
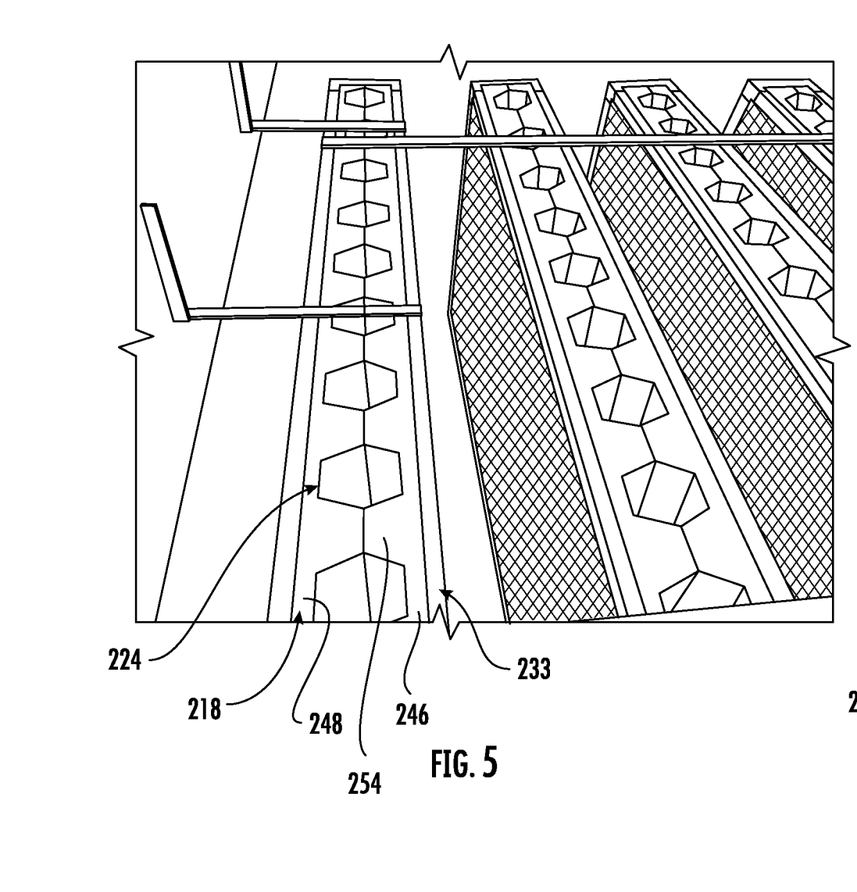
FIG. 5 is a perspective view of a ducted attenuator assembly within a genset enclosure, according to an embodiment.
Figure 6:
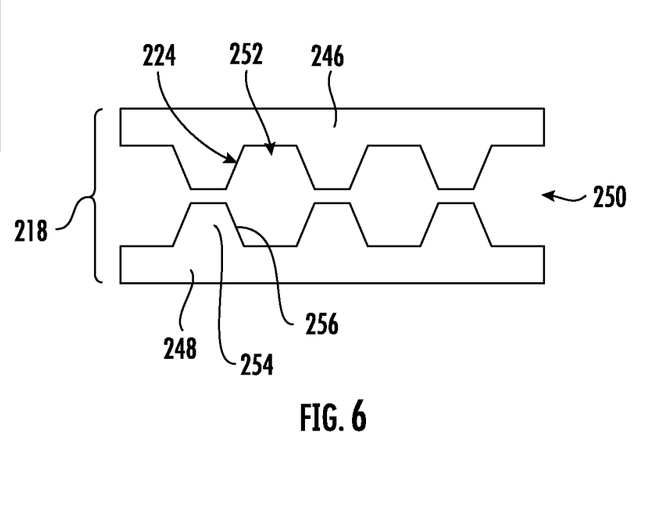
FIG. 6 is a front view of a pair of panel sections of a ducted attenuator panel from the ducted attenuator assembly of FIG. 5.

In some embodiments, as shown in FIGS. 5 and 6, at least one ducted attenuator panel 218 includes multiple layers (e.g., sheets, panel sections, etc.) of acoustic damping material. For example, the ducted attenuator panel 218 can include a first layer of acoustic damping material 246, and a second layer of acoustic damping material 248 engaged with the first layer 246. The support frame 233 can be engaged with both the first layer 246 and the second layer 248 and can apply compression to the acoustic damping materials to compress, hold, or otherwise support the first layer 246 and the second layer 248 together.

As shown in FIG. 6, at least one ducted attenuator panel 218 of the plurality of ducted attenuator panels can include a pair of panel sections 250 including the first layer 246 (e.g., the first section) and the second layer 248 (e.g., the second section). Each section of the pair of panel sections 250 can define a one-half portion of the ducts 224 that extend through the ducted attenuator panel 218. For example, each section of the pair of panel sections 250 can define a plurality of channels 252 extending between opposing ends of the section. The channels 252 can form a one-half portion of the ducts 224 when the first layer 246 and the second layer 248 are engaged with one another.

The channels 252 can be at least partially defined by a plurality of protrusions 254 extending axially away from an outer surface of the panel. The protrusions 254 can have side surfaces 256 that are oriented perpendicular to the outer surface (e.g., to form rectangular shaped channels 252), or at an oblique angle. In some embodiments, the protrusions 254 can have multiple side surfaces arranged at an angle with respect to one another, depending on the desired shape of the ducts 224. During assembly, as shown in FIG. 6, an upper surface of the protrusions in the adjacent layers can be aligned with one another and pressed together to form the plurality of ducts 224. The adjacent layers can be glued or otherwise bonded (e.g., along the upper surfaces of the protrusions 254), which can help maintain the layers in alignment during assembly of the support frame 233 (see FIG. 5).

Figure 7:
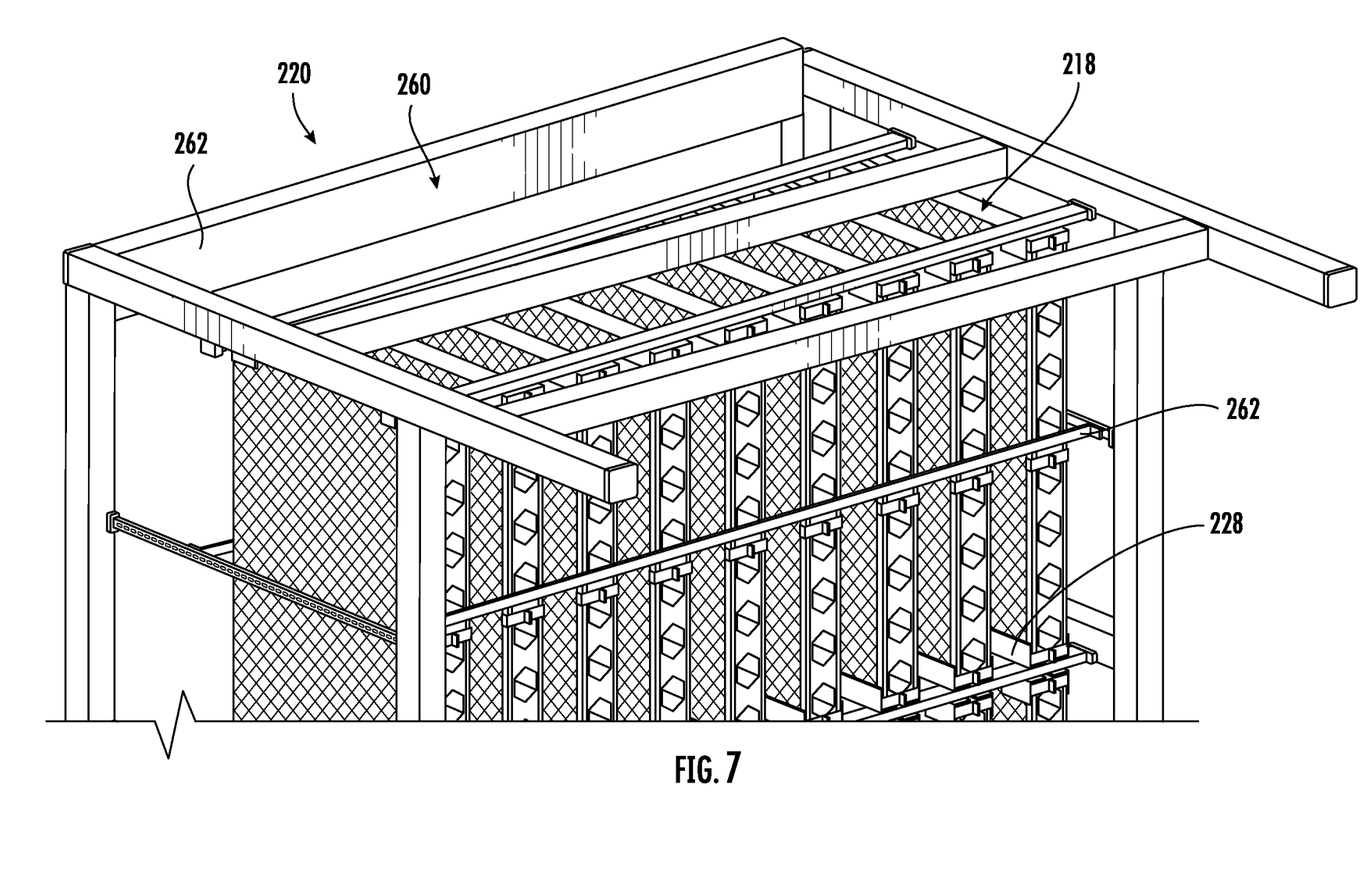
FIG. 7 is a perspective view of a first portion of the ducted attenuator assembly of FIG. 2, showing a framework of a support structure for the ducted attenuator assembly.
Figure 8:
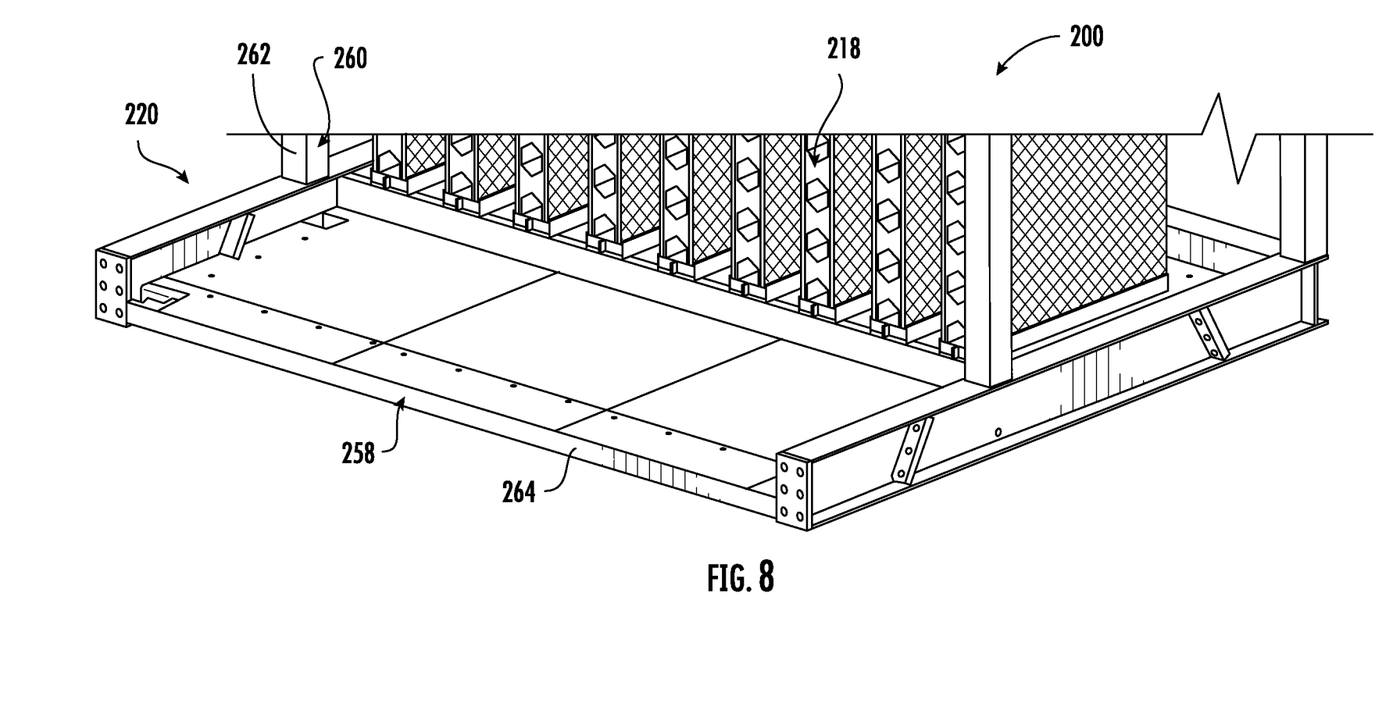
FIG. 8 is a perspective view of a second portion of the ducted attenuator assembly of FIG. 2, showing a platform of a support structure for the ducted attenuator assembly.
Figure 9:
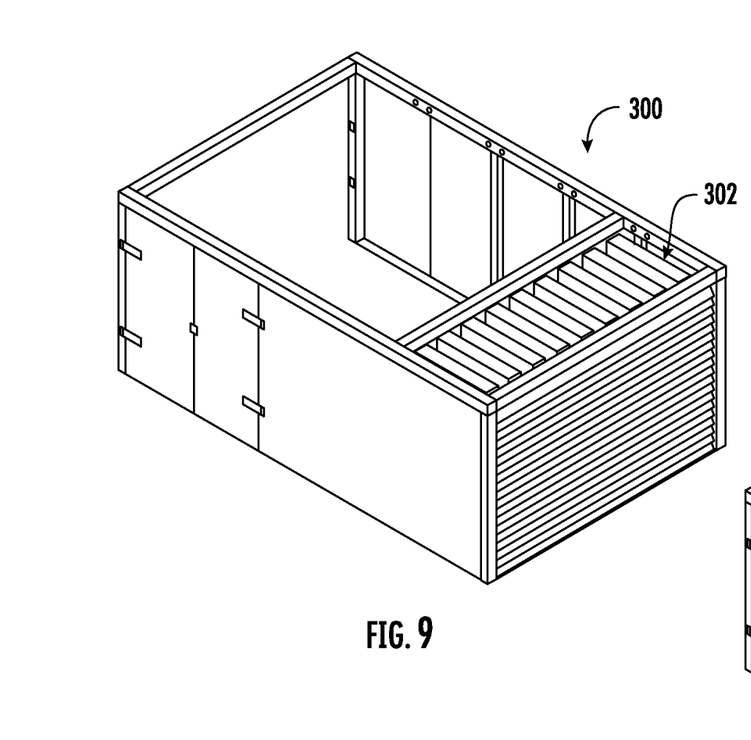
FIG. 9 is a top perspective view of a genset, according to another embodiment.
Figure 10:
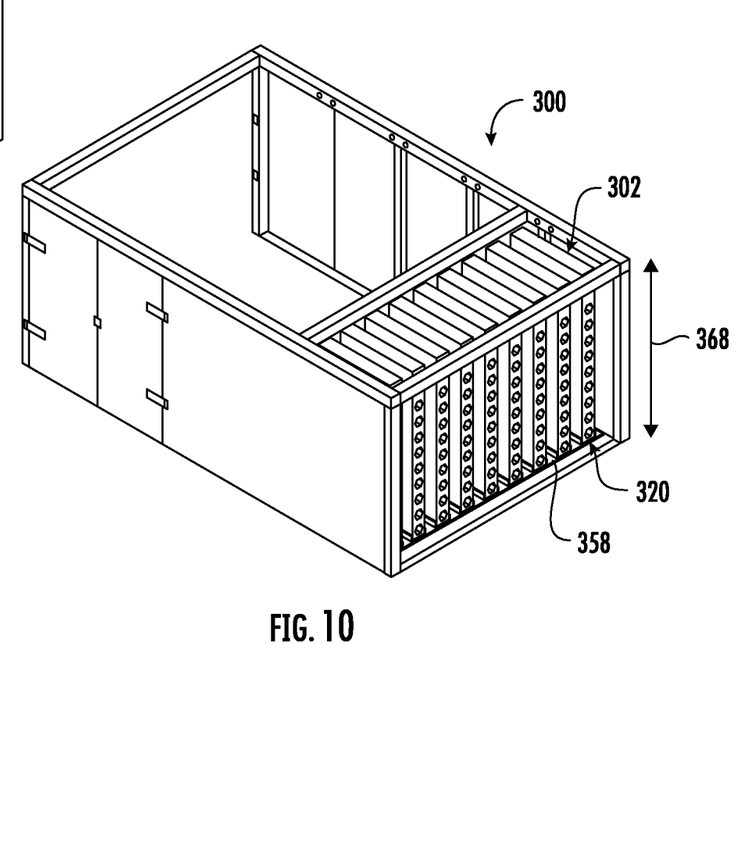
FIG. 10 is another top perspective view of the genset of FIG. 9, shown with a set of flow louvers removed from the genset.
Figure 11:
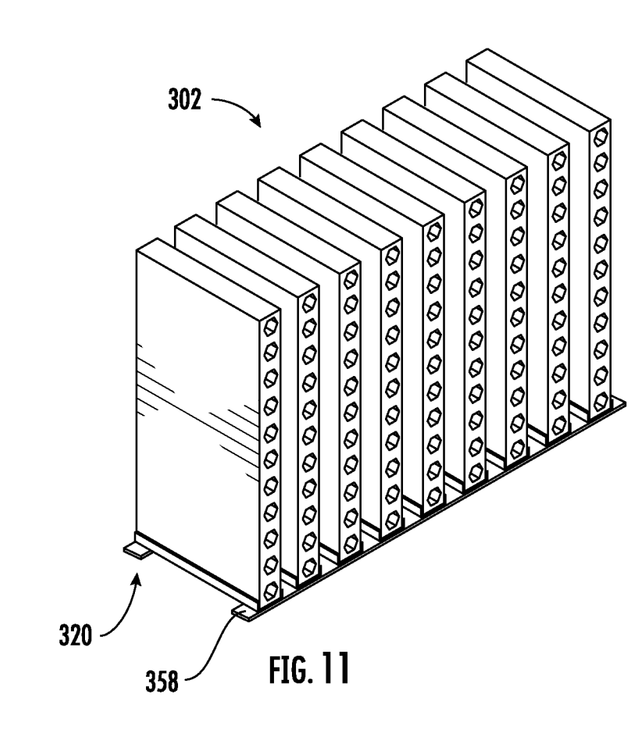
FIG. 11 is a perspective view of a ducted attenuator assembly of the genset of FIG. 9.
Figure 12:
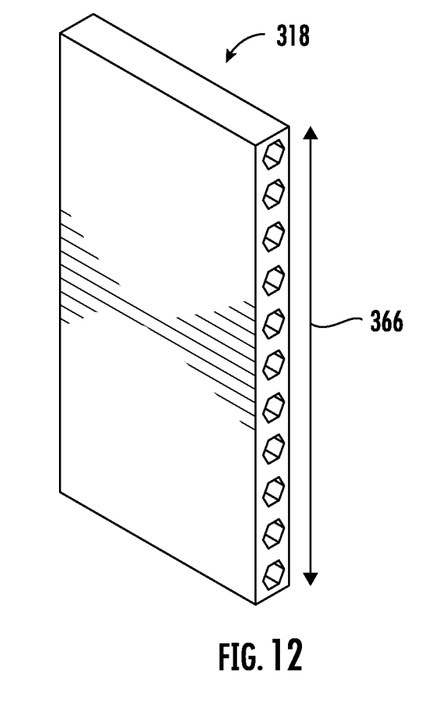
FIG. 12 is a perspective view of a ducted attenuator panel of the ducted attenuator assembly of FIG. 11.

As shown in FIGS. 7 and 8, after assembly, the ducted attenuator panels 218 are mounted to the support structure 220, which is configured to maintain (i) couple the plurality of ducted attenuator panels 218 to a genset enclosure, and (ii) to support the plurality of ducted attenuator panels 218 within the enclosure (e.g., to maintain the orientation of individual panels parallel to a flow direction through the enclosure, to maintain uniform spacing between the ducted attenuator panels 218, etc.).

As shown in FIGS. 7 and 8, the support structure 220 can include a skid 258 and framework 260 coupled to the skid 258. The framework 260 is configured to couple the plurality of ducted attenuator panels 218 to the skid 258. The framework 260 can include frame members 262 made from hollow tubular elements or solid rods (or any such elements that can be used as structural frame elements, e.g., the frame elements can be channel frames made of I, C, T channels; a flat solid plate, etc., that are welded or otherwise connected to form the framework 260). As shown in FIG. 8, frame members 262 on the skid 258 can include connectors to facilitate connection of the ducted attenuator assembly 200 to the genset enclosure. As shown in FIG. 7, at least one frame member 262 can be coupled to the plurality of ducted attenuator panels 218 (e.g., the panels within one row of the assembly). The at least one frame member 262 can extend across end faces of adjacent ones of the plurality of ducted attenuator panels 218 (e.g., in a lateral direction to maintain uniform spacing between adjacent ones of the ducted attenuator panels 218, etc.). In some embodiments, as described above, the support structure 220 (e.g., the framework 260)

can include mounts 228 defining slots, channels, etc. that are sized and arranged to nestably engage with the panels, which can facilitate servicing of the ducted attenuator assembly 200 (e.g., removal and replacement of the ducted attenuator panels 218).

As shown in FIG. 8, the skid 258 of the support structure 220 supports the framework 260 and the ducted attenuator panels 218 above a ground surface. The skid 258 is configured to support the plurality of ducted attenuator panels 218 within the at least partially enclosed space of the genset enclosure (for example, as shown in FIG. 1). In some embodiments, the skid 258 includes a platform 264 (e.g., a base wall, a floor section, a support panel, etc.) extending beneath the plurality of ducted attenuator panels 218 and supporting the plurality of ducted attenuator panels 218 perpendicular to the platform 264. In some embodiments, the platform 264 defines a portion of an outer wall of the genset enclosure. For example, the platform 264 can define a portion of the container floor 104 shown in FIG. 1, which can facilitate installation of the ducted attenuator assembly 200 into the enclosure, and reduce the number of additional fasteners/connectors required to assemble the genset. In such arrangements, a portion of the framework 260, adjacent to the platform 264 can form part of a skeletal framework of the enclosure.

The design and arrangement of the ducted attenuator assemblies described with reference to FIGS. 1-8 are provided for illustrative purposes only. It should be appreciated that many alternatives and additions are possible without departing from the inventive principles disclosed herein. For example, FIGS. 9-12 show an embodiment of a genset enclosure 300 including a ducted attenuator assembly 302 that includes only a single row of ducted attenuator panels 318. A height 366 of the ducted attenuator panels 318 is approximately equal to a height 368 of the enclosed space within the enclosure 300. The panels 218 are supported in a vertical orientation within the enclosure 300 by a support structure 320 that includes a skid 358 that is configured to couple to a container floor of the enclosure 300. In such an arrangement, the skid 358 can be provided as a separate piece from the panels 218 and assembled on-site.

Figure 13:
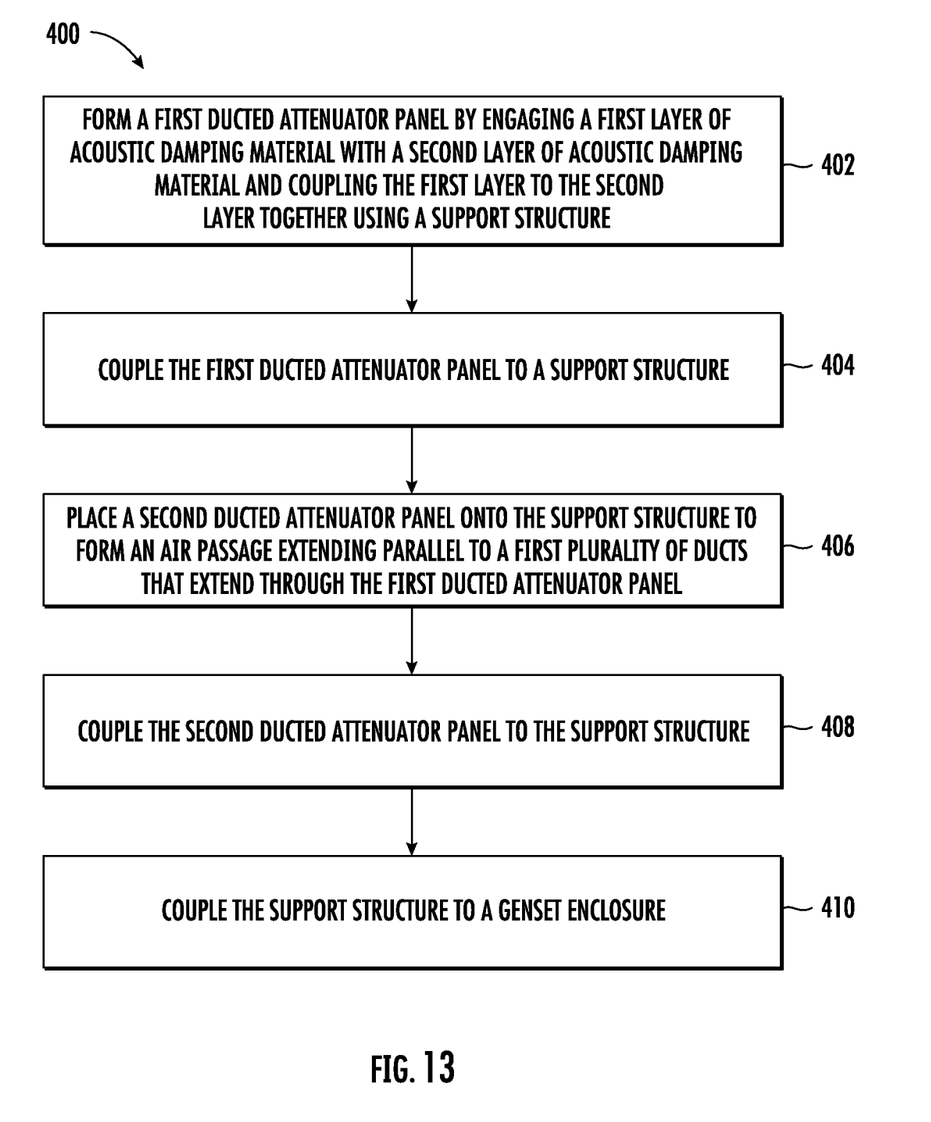
FIG. 13 is a flow diagram of a method of manufacturing a ducted attenuator assembly, according to an embodiment.

Referring now to FIG. 13, an example method of manufacturing a ducted attenuator assembly is shown, such as the ducted attenuator assemblies described with reference to FIGS. 1-12. At 402, a first ducted attenuator panel is formed. Operation 402 can include a pair of panel sections made from an acoustic damping material together to form a single panel. Operation 402 can include engaging a first layer (e.g., a first panel section) of acoustic damping material with a second layer (e.g., a second panel section) of acoustic damping material to form a ducted attenuator panel having a plurality of ducts that extend through the panel. Operation 402 can include aligning a series of channels or protrusions in the first layer with a corresponding set of channels or protrusions in the second layer. Operation 402 can also include coupling the first layer and the second layer together by gluing or otherwise bonding the first layer to the second layer.

Operation 402 can further include engaging a support frame with the first layer and the second layer, such as by applying a mesh and frame elements to the panel to compress or otherwise hold the first layer and the second layer together, and to support the sidewalls of the first layer and the second layer. For example, operation 402 can include engaging a first mesh layer with a first side of the ducted attenuator panel and engaging a second mesh layer with a second side of the ducted attenuator panel that is opposite the first side (e.g., such that the panel is "sandwiched" or otherwise disposed between the first mesh layer and the second mesh layer, etc.). Operation 402 can include coupling the first mesh layer to the second mesh layer by engaging a support frame with an outer perimeter of each of the first mesh layer and the second mesh layer, such as along perimeter edges of the panel, and welding or otherwise coupling adjacent sections of the support frame together.

At 404, the first ducted attenuator panel is coupled to the support structure. Operation 402 can include aligning the panel with a mount in the support structure inclusive of orienting the panel vertically with respect to a ground support, platform, or skid of the support structure. Operation 402 can include placing the ducted attenuator panel into a mount or bracket and fastening or otherwise coupling the first ducted attenuator to the support structure. For example, operation 404 can include fastening upper and lower ends of the panel to the support structure.

At 406, a second ducted attenuator panel is placed onto the support structure.

Operation 406 can include placing the second ducted attenuator panel a distance apart from the first ducted attenuator panel and so that (i) the second ducted attenuator panel extends parallel to the first ducted attenuator panel, and (ii) a first plurality of ducts of the first ducted attenuator panel extend parallel to a second plurality of ducts of the second ducted attenuator panel and an air passage formed between the first ducted attenuator panel and the second ducted attenuator panel (e.g., so that the second panel and the first panel are oriented in a parallel spaced relation with respect to one another).

At 408, the second ducted attenuator panel is coupled to the support structure so as to maintain a spacing between the first ducted attenuator panel and the second ducted attenuator panel. Operation 408 can include fastening upper and lower ends of the panel to the support structure to a mount of the support structure. In some embodiments, operation 408 can include placing a frame member across an end face of the first and second ducted attenuator panels and fastening or otherwise securing the frame member to the first and second ducted attenuator panels.

In some embodiments, the method 400 further includes coupling the support structure to a genset enclosure, at 410. Operation 410 can include inserting or otherwise placing the support structure into the enclosure and so that the first ducted attenuator panel and the second ducted attenuator panel are oriented parallel to an air flow direction through the enclosure. Operation 410 can also include connecting a skid and/or platform of the support structure to a structural frame of the enclosure so that the platform defines an outer wall of the enclosure. For example, operation 410 can include connecting fasteners on a support frame adjacent to the platform to a skeletal frame of the enclosure that supports the walls of the enclosure. It should be understood that the support structure and panels may be installed into the enclosure at an end user location (e.g., on-site at a location at which the genset will be used).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains.

It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A genset, comprising:
   an enclosure defining an at least partially enclosed space and a ventilation air opening, the ventilation air opening fluidly coupling the at least partially enclosed space with an environment surrounding the enclosure; and
   an attenuator assembly disposed proximate to the ventilation air opening, the attenuator assembly including a plurality of ducted attenuator panels arranged parallel to one another and parallel to an air flow direction through the enclosure, the plurality of ducted attenuator panels spaced apart from one another to form a plurality of air passages therebetween, at least one ducted attenuator panel of the plurality of ducted attenuator panels defining a plurality of ducts extending therethrough along the air flow direction.

2. The genset of claim 1, wherein the enclosure comprises a plurality of walls including a floor and side walls extending perpendicular to the floor, the plurality of ducted attenuator panels spaced apart from the side walls and arranged parallel to the side walls.

3. The genset of claim 1, wherein the at least one ducted attenuator panel of the plurality of ducted attenuator panels is made from an acoustic damping material that includes non-fibrous material.

4. The genset of claim 1, wherein the at least one ducted attenuator panel of the plurality of ducted attenuator panels includes a pair of panel sections, each section of the pair of panel sections defining a plurality of channels extending between opposing ends of the respective section, the plurality of channels defining the plurality of ducts.

5. The genset of claim 1, wherein the at least one ducted attenuator panel of the plurality of ducted attenuator panels comprises:
   a layer of acoustic damping material;
   a support frame extending along edges of the layer of acoustic damping material; and
   a mesh coupled to the support frame and supporting the layer of acoustic damping material within the support frame.

6. The genset of claim 1, wherein the attenuator assembly further comprises a support structure coupled to the plurality of ducted attenuator panels so as to maintain approximately uniform spacing between adjacent ones of the plurality of ducted attenuator panels.

7. The genset of claim 1, wherein the attenuator assembly further comprises a skid coupled to the plurality of ducted attenuator panels, the skid supporting the plurality of ducted attenuator panels within the at least partially enclosed space.

8. The genset of claim 7, wherein the skid includes a platform extending beneath the plurality of ducted attenuator panels and supporting the plurality of ducted attenuator panels, wherein the platform defines a portion of an outer wall of the enclosure.

9. The genset of claim 1, wherein at least one duct of the plurality of ducts has a hexagonal cross-sectional shape.

10. An attenuator assembly, comprising:
    a plurality of ducted attenuator panels, at least one panel of the plurality of ducted attenuator panels defining a plurality of ducts extending therethrough; and
    a support structure supporting the plurality of ducted attenuator panels in a parallel spaced arrangement so as to define a plurality of air passages between adjacent ones of the plurality of ducted attenuator panels, the plurality of air passages extending parallel to the plurality of ducts.

11. The attenuator assembly of claim 10, wherein the support structure is configured to couple the plurality of ducted attenuator panels to an enclosure and to support the plurality of ducted attenuator panels within the enclosure.

12. The attenuator assembly of claim 10, wherein the support structure includes a frame member that is coupled to the plurality of ducted attenuator panels, the frame member extending across end faces of adjacent ones of the plurality of ducted attenuator panels.

13. The attenuator assembly of claim 10, wherein the at least one panel comprises:
    a first layer of acoustic damping material;
    a second layer of acoustic damping material engaged with the first layer, the first layer and the second layer together defining the plurality of ducts; and a support frame engaged with the first layer and the second layer and holding the first layer and the second layer together.

14. The attenuator assembly of claim 10, wherein the at least one panel is made from an acoustic damping material, the plurality of ducts spaced at approximately equal intervals along a linear column across the at least one panel.

15. The attenuator assembly of claim 10, wherein a spacing between adjacent ones of the plurality of ducts is greater than or equal to half of a height of at least one duct of the plurality of ducts.

16. A method of manufacturing a ducted attenuator assembly, comprising:
coupling a first ducted attenuator panel to a support structure, the first ducted attenuator panel defining a first plurality of ducts extending therethrough along an air flow direction across the first ducted attenuator panel;
placing a second ducted attenuator panel onto the support structure a distance apart from the first ducted attenuator panel and so that (i) the second ducted attenuator panel extends parallel to the first ducted attenuator panel and parallel to the air flow direction, and (ii) the first plurality of ducts of the first ducted attenuator panel extend parallel to a second plurality of ducts of the second ducted attenuator panel and an air passage formed between the first ducted attenuator panel and the second ducted attenuator panel; and
coupling the second ducted attenuator panel to the support structure so as to maintain a spacing between the first ducted attenuator panel and the second ducted attenuator panel.

17. The method of claim 16, further comprising:
forming the first ducted attenuator panel by engaging a first layer of acoustic damping material with a second layer of acoustic damping material to form a ducted attenuator panel having the first plurality of ducts that extend therethrough; and
coupling the first layer and the second layer together by engaging a support frame with the first layer and the second layer.

18. The method of claim 17, wherein coupling the first layer and the second layer together comprises:
engaging a first mesh layer with a first side of the ducted attenuator panel;
engaging a second mesh layer with a second side of the ducted attenuator panel that is opposite the first side; and
coupling the first mesh layer to the second mesh layer.

19. The method of claim 16, further comprising coupling the support structure to an enclosure by connecting a platform of the support structure to a structural frame of the enclosure so that the platform defines a portion of an outer wall of the enclosure.

20. The method of claim 19, wherein coupling the support structure to the enclosure comprises arranging the first ducted attenuator panel and the second ducted attenuator panel parallel to the air flow direction.

* * * * *